United States Patent
Potapova et al.

(10) Patent No.: US 7,923,406 B2
(45) Date of Patent: Apr. 12, 2011

(54) SUPPORT FOR FUEL REFORMING CATALYST WITH EXCELLENT HEAT AND MASS TRANSFER CHARACTERISTICS AND METHOD OF PREPARING THE SAME

(75) Inventors: Yulia Potapova, Yongin-si (KR); Soon-ho Kim, Seoul (KR); Hyun-chul Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1027 days.

(21) Appl. No.: 11/336,838

(22) Filed: Jan. 23, 2006

(65) Prior Publication Data
US 2006/0165986 A1 Jul. 27, 2006

(30) Foreign Application Priority Data
Jan. 21, 2005 (KR) .................. 10-2005-0005816

(51) Int. Cl.
| | |
|---|---|
| B01J 23/08 | (2006.01) |
| B01J 21/08 | (2006.01) |
| B01J 23/00 | (2006.01) |
| B01J 23/10 | (2006.01) |
| B01J 23/02 | (2006.01) |
| B01J 23/06 | (2006.01) |
| C01F 7/02 | (2006.01) |

(52) U.S. Cl. ........ 502/325; 502/302; 502/305; 502/340; 502/349; 502/355; 502/439; 423/625; 423/627

(58) Field of Classification Search .................. 502/302, 502/305, 325, 340, 349, 355, 439; 423/625, 423/627
See application file for complete search history.

(56) References Cited

U.S. PATENT DOCUMENTS

| | | | | |
|---|---|---|---|---|
| 4,315,839 | A * | 2/1982 | Bouge et al. | 502/8 |
| 6,262,131 | B1 * | 7/2001 | Arcuri et al. | 518/700 |
| 2004/0102315 | A1 * | 5/2004 | Bailie et al. | 502/304 |

FOREIGN PATENT DOCUMENTS

| | | |
|---|---|---|
| JP | 55-116623 | 9/1980 |
| JP | 55-139837 | 11/1980 |
| JP | 59-112840 | 6/1984 |
| JP | 6-063423 | 3/1994 |

OTHER PUBLICATIONS

Office Action issued by the Japanese Patent Office on Jun. 11, 2008.

* cited by examiner

*Primary Examiner* — David M. Brunsman
*Assistant Examiner* — Kevin M Johnson
(74) *Attorney, Agent, or Firm* — Christie, Parker & Hale, LLP

(57) ABSTRACT

A support for a fuel reforming catalyst includes aluminum (Al); and aluminum oxide ($Al_2O_3$) encapsulating the aluminum, wherein a total volume of micropores and mesopores is in the range of 0.1 to 1.0 ml/g per unit mass, and a volume of macropores is in the range of 0.4 to 1.2 ml/g per unit mass, and a method of preparing the same. The support has excellent heat transfer characteristics due to its high thermal conductivity and excellent mass transfer characteristics because the micropores, mesopores, and macropores exist in a proper ratio. Accordingly, if the support is used for a supported catalyst that is used in a reaction, in which the reaction rate is controlled by heat transfer and mass transfer, such as a fuel reforming reaction, the activity of the catalyst is enhanced. In addition, the support can be easily formed as desired due to its high mechanical strength.

23 Claims, 7 Drawing Sheets

SUPPORT FOR FUEL REFORMING CATALYST WITH EXCELLENT HEAT AND MASS TRANSFER CHARACTERISTICS AND METHOD OF PREPARING THE SAME

CROSS-REFERENCE TO RELATED APPLICATIONS

This application claims the benefit of Korean Patent Application No. 2005-5816, filed Jan. 21, 2005, in the Korean Intellectual Property Office, the disclosure of which is incorporated herein by reference.

BACKGROUND OF THE INVENTION

1. Field of the Invention

Aspects of the present invention relate to a support for a fuel reforming catalyst, and more particularly, to a support for a fuel reforming catalyst with excellent heat and mass transfer characteristics to be able to exhibit higher activity properties even when containing the same quantity of catalyst as a conventional support, and a method of preparing the same.

2. Description of the Related Art

Fuel cells form an energy generating system in which the chemical energy of oxygen and hydrogen contained in hydrocarbons such as methanol, ethanol, and natural gas is directly converted into electric energy.

In general, a fuel cell system has a basic structure of a stack, a fuel processor (FP), a fuel tank, a fuel pump, and the like. The stack forms the body of the fuel cell and has a stacked structure of a few or tens of unit cells, each including a membrane electrode assembly (MEA) and a separator or bipolar plate. A fuel pump supplies a fuel contained in a fuel tank to a fuel processor. The fuel processor reforms and purifies the supplied fuel to generate hydrogen and supplies the hydrogen to the stack. In the stack, the hydrogen and oxygen electrochemically react to generate electrical energy.

FIG. 1 is a flow chart illustrating stages of processing a fuel 30 in a fuel processor 10 of a conventional fuel cell system. Referring to FIG. 1, a desulfurization process, a reforming process 20, and a CO removing process are performed in the fuel processor 10. In particular, the CO removing process may include a high-temperature shift reaction, a low-temperature shift reaction, and a preferential oxidation ("prox") reaction. Using these processes, the fuel 30 is generated, and the generated fuel 30 is supplied to the stack.

A reformer, which is used in the reforming process 20, reforms a fuel formed of hydrocarbon using a reforming catalyst. It is increasingly likely that the hydrocarbon will be methane, because a liquefied natural gas mainly formed of methane is expected to be a prominent feedstock of fuel cells in the future. In the reforming process, steam ($H_2O$) is added to the methane to produce hydrogen through Reaction Scheme 1:

[Reaction Scheme 1]

$$CH_4 + 2H_2O \longrightarrow CO_2 + 4H_2$$

The Reaction Scheme 1 occurring in the fuel reforming process is an endothermic process that requires a great amount of heat. Accordingly, the reforming process requires a supply of heat.

Meanwhile, a rate-determining step, which determines the overall rate of reaction, can be a reaction step, a heat transfer step, a mass transfer step, or an adsorption/desorption step. In the fuel reforming, the rate-determining step is a heat transfer step or a mass transfer step. Accordingly, in order to increase the entire reaction rate, it is important to increase the heat transfer rate and the mass transfer rate.

Pores formed in a catalyst support are categorized into micropores, mesopores, and macropores, according to the pore size. According to the definition of pores set by the International Union of Pure and Applied Chemistry (IUPAC), a micropore has a size less than 2 nm, a mesopore has a size of 2-50 nm, and a macropore has a size greater than 50 nm. Meanwhile, in some cases, a pore having a size of 10-100 μm is defined as an ultrapore though such a definition is not set by the IUPAC. In this specification, however, pores having a size of 10-100 μm are also regarded as macropores.

When the proportion of micropores or mesopores is high, a relatively large surface area of the catalyst support can be obtained, which disadvantageously makes mass transfer slower. Accordingly, when the rate-determining step is a reaction step, a high proportion of micropores is advantageous.

When the proportion of macropores is high, the surface area becomes smaller, but faster mass transfer can be obtained. Accordingly, when the rate-determining step is the heat transfer step or the mass transfer step, a high proportion of macropores is advantageous. However, when the proportion of macropores and mesopores is substantially small, the entire surface area is excessively reduced and thus the subsequently manufactured supported catalyst is less active.

When a reaction is endothermic, like a fuel reforming process, and the heat transfer or mass transfer controls the overall reaction rate, micropores, mesopores, and macropores need to exist in a proper ratio. However, a support having such a pore distribution has not yet been developed. Conventional supported catalysts have structures formed mainly of macropores, or formed mainly of micropores and mesopores.

In order to facilitate heat transfer, the surface of a metal can be encapsulated with a metal oxide acting as a support. However, the thickness of the formed metal oxide is typically too small, and an adhesive force between the metal and the metal oxide is weak.

SUMMARY OF THE INVENTION

Aspects of the present invention provide a support for a fuel reforming catalyst with excellent heat transfer and mass transfer characteristics in which micropores, mesopores, and macropores exist in a proper ratio, and thus the activity of the catalyst with respect to fuel reforming is enhanced.

Aspects of the present invention also provide a method of preparing a support for a fuel reforming catalyst.

Aspects of the present invention also provide a supported catalyst for fuel reforming using the support for the fuel reforming catalyst.

Aspects of the present invention also provide a fuel processor including the supported catalyst for fuel reforming.

Additional aspects and/or advantages of the invention will be set forth in part in the description which follows and, in part, will be obvious from the description, or may be learned by practice of the invention.

According to an aspect of the present invention, there is provided a support for a fuel reforming catalyst, the support including aluminum (Al) and aluminum oxide ($Al_2O_3$) encapsulating the aluminum, wherein the total volume of micropores and mesopores in the support is in a range of 0.1 to 1.0 ml/g per unit mass, and the volume of macropores in the support is in a range of 0.4 to 1.2 ml/g per unit mass.

According to another aspect of the present invention, there is provided a method of preparing a support for a fuel reforming catalyst, the method including: performing a hydrothermal treatment by heating aluminum in water; drying the hydrothermal-treated result; and calcining the dried result.

According to yet another aspect of the present invention, there is provided a supported catalyst for fuel reforming, the supported catalyst including the support for fuel reforming catalyst and the active components.

According to still another aspect of the present invention, there is provided a fuel processor for fuel reforming.

According to still another aspect of the present invention, there is provided a fuel cell system including a source of fuel, a fuel processor that includes a desulfurization device, a reformer and a CO removing device, and at least one fuel cell, wherein the reformer includes the supported catalyst.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
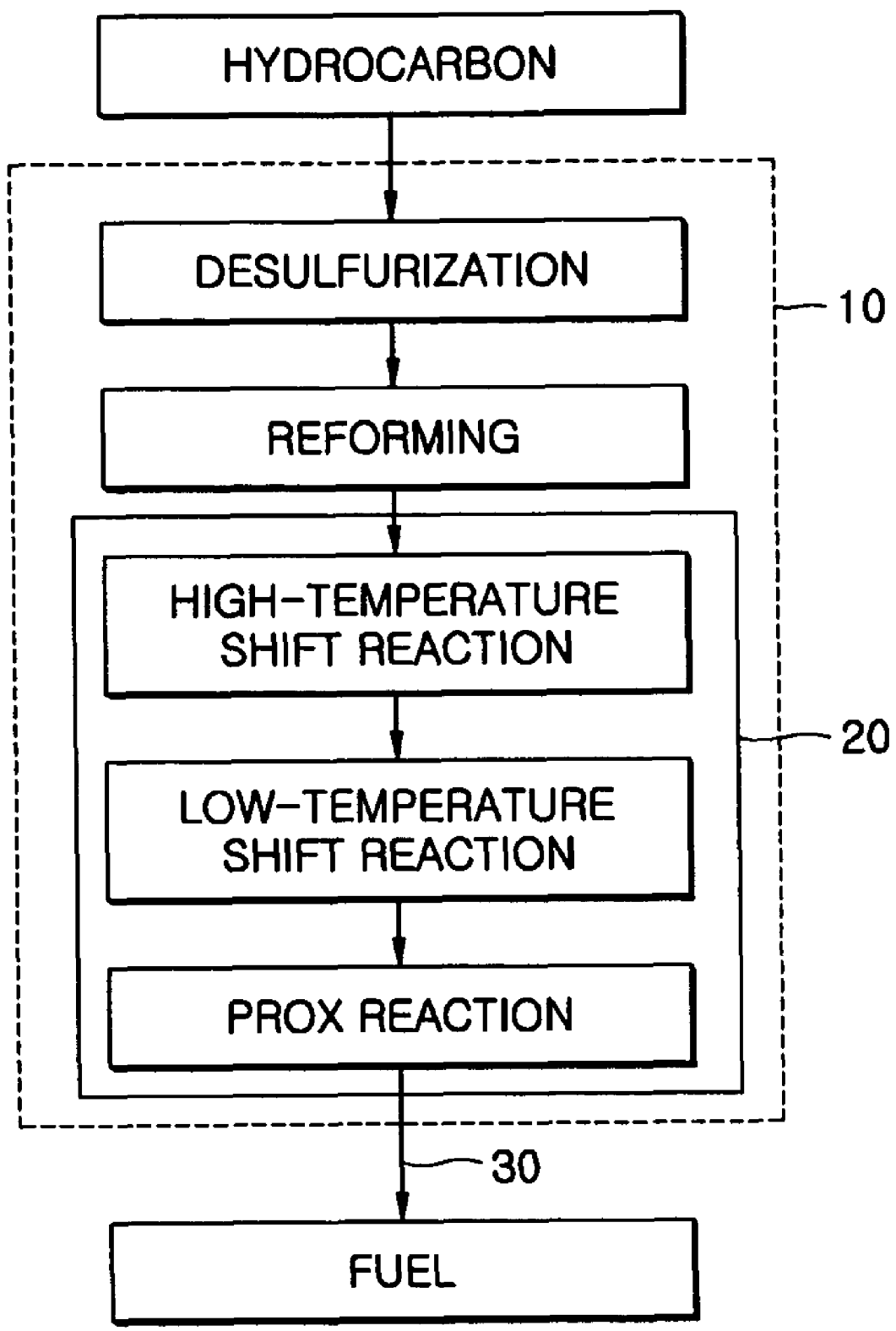
FIG. 1 is a flow chart illustrating stages of processing a fuel in a fuel processor of a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In a support for a fuel reforming catalyst according to an embodiment of the present invention, aluminum is encapsulated with an aluminum oxide, and micropores, mesopores, and macropores exist in a proper ratio. In particular, the total volume of micropores and mesopores of the support may be in the range of 0.1-1.0 ml/g per unit mass, and the volume of macropores of the support may be in the range of 0.4-1.2 ml/g per unit mass. An incremental pore volume distribution according to the pore size of the macropores, mesopores, and macropores of the present invention may be multimodal.

As used herein, a micropore is defined as having a size less than 2 nm, a mesopore is defined as having a size of 2-50 nm, and a macropore is defined as having a size greater than 50 nm.

The support for the fuel reforming catalyst according to an embodiment of the present invention will now be described in more detail. In terms of structure, an aluminum core is encapsulated with an aluminum oxide. Since thermally conductive metal is contained in the support, better heat transfer can be obtained than with a support formed of aluminum oxide only.

Neighboring encapsulating aluminum oxides may be agglomerated. That is, metal aluminum particles may be homogeneously distributed in a matrix of aluminum oxides, or an aluminum oxide may surround a core of metal aluminum and aluminum oxides may partially overlap and adhere to each other.

The weight ratio of the aluminum to the aluminum oxide may be in the range of 1:9 to 8:2, and, for example, may be 2:8 to 6:4. When the weight ratio of the aluminum to the aluminum oxide is greater than 8:2, the micropores, the mesopores, and the macropores are not in a proper ratio and mass transfer becomes slower. In addition, when the weight ratio of the aluminum to the aluminum oxide is less than 1:9, thermal conductivity inside the support is relatively reduced and a decrease in the reaction rate due to a relatively low heat transfer cannot be prevented, and thus the rate of the overall reaction decreases.

The porosity of the support for the fuel reforming catalyst according to an embodiment of the present invention may be in the range of 0.1 to 0.9, and, for example, may be 0.25-0.75. When the porosity is less than 0.1, the specific surface area is reduced and the subsequently manufactured catalyst is less active. When the porosity is greater than 0.9, the mechanical property decreases so that a sufficient strength cannot be retained.

The volume of the micropores may be in the range of 5-20%, the volume of the mesopores may be in the range of 30-50%, and the volume of the macropores may be in the range of 40-65%, with respect to the entire volume of pores. When the volumes of the micropores, the mesopores, or the macropores are outside these ranges, that is, the volume of one of the micropores, the mesopores, or the macropores is larger or smaller than the respective ranges, the specific surface area decreases and heat transfer and/or mass transfer is not efficient. As a result, the entire reaction rate decreases.

A layer of the aluminum oxide may have a thickness of 10-65%, or, for example, 15-55%, of a radius of a particle of the support for the fuel reforming catalyst according to an embodiment of the present invention. As described above, when it is assumed that the support particle for the fuel reforming catalyst is formed of a metal aluminum core encapsulated with an aluminum oxide, the shape of the support particle may be an incomplete sphere or may be agglomerated with other surrounding particles. For determining whether a layer of aluminum oxide has a thickness of 10-65% of the radius of a particle of support, any suitable method for calculating the thickness of the aluminum oxide may be used. For example, assuming that the support particle for the fuel reforming catalyst is spherical, the thickness of the aluminum oxide can be calculated algebraically using the following logic.

Assuming that a pure aluminum particle, which is to be processed into the support for the fuel reforming catalyst according to an embodiment of the present invention, is spherical, Equation 1 below can be obtained:

$$V_0 = \frac{4}{3}\pi r_0^3 = \frac{m_0}{\rho} \qquad \text{[Equation 1]}$$

where $r_0$ is the radius of the pure aluminum particle, $V_0$ is the volume of the pure aluminum particle, $m_0$ is the mass of the pure aluminum particle, and $\rho$ is the density of the aluminum particle.

The mass m* of the generated aluminum oxide ($Al_2O_3$) can be obtained using Equation 2 below:

$$m^* = \frac{m_0 x}{2M} M^* \quad \text{[Equation 2]}$$

where x is the conversion from pure aluminum to an aluminum oxide, M is the atomic mass of aluminum, and M* is the formula mass of the aluminum oxide.

The relationship between the volume V and the radius r of an unreacted aluminum particle is represented by Equation 3:

$$V = \frac{4}{3}\pi r^3 = \frac{m_0(1-x)}{\rho}. \quad \text{[Equation 3]}$$

The relationship between the volume V* of the generated aluminum oxide particle and the radius R of the entire particle is represented by Equation 4:

$$V^* = \frac{4}{3}\pi(R^3 - r^3) = \frac{m_0 x M^*}{2M\rho^*} \quad \text{[Equation 4]}$$

where ρ* is the density of the aluminum oxide; and R is different from $r_0$ and varies according to the conversion rate. The radius R, which varies according to the conversion rate of the reaction, can be obtained using Equation 5 below:

$$R = \sqrt[3]{\frac{3}{8\pi}\frac{m_0 x M^*}{M\rho^*} + \frac{3}{4\pi}\frac{m_0(1-x)}{\rho}}. \quad \text{[Equation 5]}$$

The thickness d of the layer of aluminum oxide can be obtained using Equation 6 formed by combining Equations 3 and 5:

$$d = \sqrt[3]{\frac{3}{8\pi}\frac{m_0 x M^*}{M\rho^*} + \frac{3}{4\pi}\frac{m_0(1-x)}{\rho}} - \sqrt[3]{\frac{3}{4\pi}\frac{m_0(1-x)}{\rho}} \quad \text{[Equation 6]}$$

The thickness d of the aluminum oxide layer measured as described above is divided by the radius R of the entire particle. The result, for a support particle according to an aspect of the present invention, may be in the range of 0.10 to 0.65, and for example, may be 0.15-0.55.

The mechanical strength of the support for the fuel reforming catalyst may be in the range of 70-250 kg/cm², which is much higher than the mechanical strength of a conventional support of 40-50 kg/cm². Due to such an excellent mechanical strength, the support according to an embodiment of the present invention can be easily formed into a desired form.

A method of preparing a support for a fuel reforming catalyst according to an embodiment of the present invention will now be described in detail.

Figure 2A:
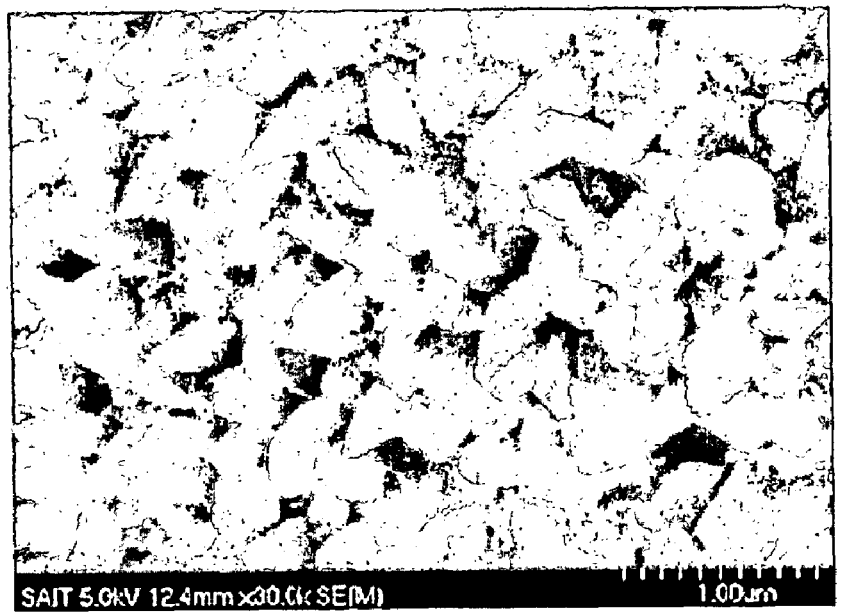
FIG. 2A is a scanning electron microscope (SEM) image of a surface of an aluminum oxide generated through hydrothermal treatment.
Figure 2B:
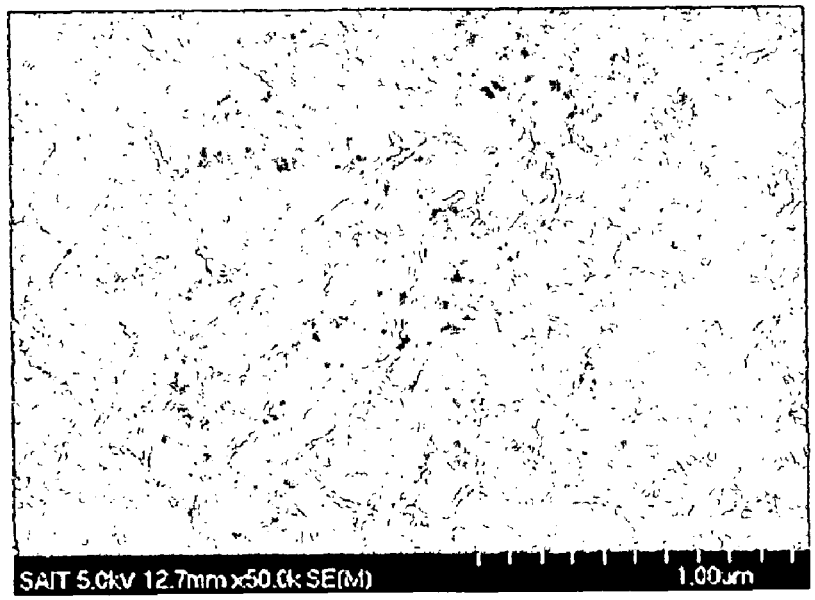
FIG. 2B is a SEM image of a surface of an aluminum oxide generated through a simple heating of aluminum in boiling water.

First, pure aluminum is added to water and a hydrothermal treatment process is performed. Hydrothermal treating, which is different from a simple heating in boiling water, refers to heating a material by water in a closed volume, such as, for example, in an autoclave. The results of hydrothermal treating and simple heating are different from each other, as shown in FIGS. 2A and 2B. FIG. 2A is a scanning electron microscope (SEM) image of a surface of an aluminum oxide generated through hydrothermal treatment, and FIG. 2B is an SEM image of a surface of an aluminum oxide generated through simple heating in boiling water. Referring to FIG. 2A, the hydrothermally treated aluminum oxide has a developed oxide layer. However, referring to FIG. 2B, the simply heated aluminum oxide does not have a well developed oxide layer.

The hydrothermal treatment may be performed at 120-280° C., and for example, 140-260° C. When the hydrothermal treatment temperature is less than 120° C., water evaporation is insufficient and a hydrothermal reaction does not occur. When the hydrothermal treatment temperature is greater than 280° C., the internal pressure of the vessel in which the hydrothermal treatment is performed, such as, for example, an autoclave, becomes excessively high, and the autoclave may be broken. The aluminum may be added in various forms such as powder, wire, foam, etc.

When the hydrothermal treatment time is too short or too long, a proper ratio of aluminum to aluminum oxide cannot be obtained. The hydrothermal treatment time may be in the range of 1-24 hours, and, for example, may be 1-10 hours. When the hydrothermal treatment time is less than 1 hour, the aluminum oxide is insufficiently produced, so that the weight ratio of aluminum to aluminum oxide is greater than 4 and aluminum is incompletely encapsulated in the aluminum oxide. On the other hand, when the hydrothermal treatment time is greater than 24 hours, an excessive amount of aluminum oxide is produced so that the effect of aluminum, which is used to improve thermal conductivity, is negligible.

In consideration of these effects, the hydrothermal treatment may further include the use of a surface active agent, such as a surfactant. The surfactant controls the microstructure of a support to be produced such that the pores are spherical or oval.

In addition, hydrothermal treatment may further include the use of an additive to improve the characteristics of the support to be produced. The additive may be CaO, $Ca(NO_3)_2$, MgO, $TiO_2$, $La_2O_3$, or the like. When $Ca(NO_3)_2$, $Mg(NO_3)_2$, $Ti(NO_3)_4$, $La(NO_3)_3$, or Ca is added, the mechanical strength of the support may increase. When Mg is added, formation of coking is prevented. When Ti is added, the catalyst activity increases. When La is used together with Ni, the catalytic property of Ni improves and the thermal stability of alumina improves. As a result of the hydrothermal reaction, a metal oxide and $AlO_x(OH)_y$ are produced.

The result of the hydrothermal reaction containing $AlO_x(OH)_y$ is dried to remove moisture because in the presence of moisture, the structure of a support that is the final product generated in a subsequent calcination process may collapse.

When the drying temperature is too low, moisture is insufficiently removed and problems as described above arise. On the other hand, when the drying temperature is too high, the preparation process for the support is uneconomical. In consideration of these effects, the drying temperature may be in the range of 100-200° C., and for example, may be 120-180° C.

When the drying time is too short, moisture is insufficiently removed and problems as described above arise. On the other hand, when the drying time is too long, the preparation process for the support is uneconomical. In consideration of these effects, the drying time may be in the range of 2-12 hours, and for example, may be 4-10 hours.

The dried result is calcined in a heating device having a heating space, such as an oven or a heating furnace. During the calcination process, —OH of $AlO_x(OH)_y$ is removed in the form of water and an aluminum oxide is generated.

When the calcination temperature is too low, $AlO_x(OH)_y$ is incompletely oxidized and the thermal stability of the pore structure is unfavorable. In addition, micropores, mesopores, and macropores are formed in an inappropriate ratio, and —OH cannot be removed in the form of water, and thus, aluminum oxide may not be generated. On the other hand, when the calcination temperature is too high, micropores are destroyed and aluminum encapsulated with aluminum oxide melts to leak out. In consideration of these effects, the calcination temperature may be in the range of 500-850° C., and for example, may be 520-820° C.

When the calcination time is too short, micropores, mesopores, and macropores are not in a proper ratio, and the crystallinity of the aluminum oxide generated decreases so that the support is less efficient for heat and mass transfer. When the calcination time is too long, the preparation process for the support is uneconomical. In consideration of these effects, the calcination time may be in the range of 2-12 hours, and for example, may be 4-10 hours.

The aluminum oxide phase of the support may be selected by selecting the hydrothermal treatment temperature and the sustaining time of the hydrothermal treatment. The phase can be changed in the subsequent high-temperature calcination process. When the hydrothermal treatment temperature is low, γ-alumina can be attained. On the other hand, when the hydrothermal treatment temperature is high, aluminum oxide having both γ-alumina and α-alumina can be attained. Even when γ-alumina is attained, an aluminum oxide having both γ-alumina and α-alumina can be attained by increasing the calcination temperature. Two phases of alumina can be selectively produced when needed.

The support for the fuel reforming catalyst prepared immediately after calcination may be in bulk form. Such a bulk form can be crushed into a proper shape as required.

Hereinafter, a supported catalyst for fuel reforming according to an embodiment of the present invention and a method of preparing the same will be described in detail.

An active component may be added in situ when the support is prepared. Alternatively, an active component may be dispersed in a prepared support using any known method. The amount of the active component may be in the range of 0.1 to 40 parts by weight, and for example, may be 1-25 parts by weight, based on 100 parts by weight of the supported catalyst.

When an active component is added in situ, the hydrothermal treatment may be performed by further including in the sealed vessel a precursor of a metal that is active in fuel reforming. The metal precursor may be water-soluble or water-insoluble. When the metal precursor is water-insoluble, aluminum powder and the precursor of the active metal are mixed together and added to water and the hydrothermal treatment is performed thereon in a sealed vessel.

When the metal precursor is water-soluble, the metal precursor is dissolved in water and then aluminum powder is added to this solution. The hydrothermal treatment is performed thereon in a sealed vessel.

Furthermore, a nitrate salt solution of Ca or Mg can be added to aluminum powder to improve catalytic properties such as mechanical strength and coke resistance.

In both cases described above, as a result of the hydrothermal reaction, the oxide of the active metal and $AlO_x(OH)_y$ are produced, as described above. The metal oxide and $AlO_x(OH)_y$ resulting from the hydrothermal reaction are then calcined to produce a catalyst for fuel reforming in which an active component is supported.

The catalyst for fuel reforming according to an embodiment of the present invention may be prepared in situ as described above, or may be separately prepared by impregnating the support for the fuel reforming catalyst described above with an active component. The impregnating method of the active component may be any common method known in the art.

The active component may be a metal catalyst component that is active in fuel reforming. The active component may be a transition metal. For example, the metal catalyst may be Pt, Ni, Mo, Co, Pd, Ru, Rh, La, Ca, Mg, Ti, or combinations or alloys thereof.

The active component may be dispersed in the prepared support using various known methods such as deposition, precipitation, co-precipitation, impregnation, sputtering, gas-phase grafting, liquid-phase grafting, incipient-wetness impregnation, and the like.

A fuel processor including the supported catalyst for reforming fuel to be delivered to a fuel cell according to an embodiment of the present invention will now be described in detail. In order to produce the fuel processor, a reforming device including a supported catalyst for fuel reforming is manufactured and then a fuel processor including the reforming device is manufactured. For example, the supported catalyst for fuel reforming may be filled in, for example, a tubular reactor or a mixed flow reactor. However, the supported catalyst for fuel reforming can be filled in other reactors. The fuel processor may include a desulfurizer, which removes sulfur from a hydrocarbon fuel source prior to reforming, and a CO removal device, which removes CO from the reformed fuel before it enters a fuel cell. The desulfurizer can be any suitable desulfurizer, such as, for example, a desulfurizer including an adsorbent material. The CO removal device can be any suitable CO removal device, such as, for example, a CO removal device that accomplishes a high-temperature shift reaction, a low-temperature shift reaction, and a prox reaction or a CO removal device that contains a catalytic system that removes CO.

A fuel cell system including a fuel processor that includes the supported catalyst for reforming fuel to be delivered to a fuel cell according to an embodiment of the present invention will now be described in detail. Typically, a fuel cell system includes a fuel source, such as, for example, a fuel tank and a fuel pump. Between the fuel source and the fuel cell, there is typically a fuel processor as described above for reforming fuel and removing possible contaminants. As described above, the fuel processor may include a desulfurizer, a fuel reformer that includes a supported catalyst as described herein and a CO remover. The reformed fuel is delivered to at least one fuel cell, or, more commonly, to a fuel cell stack that includes a plurality of stacked unit cells, each including a membrane electrode assembly and a separator or bipolar plate.

A support for fuel reforming catalyst according to an embodiment of the present invention has excellent heat transfer characteristics due to its high thermal conductivity and excellent mass transfer characteristics because micropores, mesopores, and macropores exist in a proper ratio. Accordingly, if the support is used for a supported catalyst that is used in a reaction in which the reaction rate is controlled by heat transfer and mass transfer, such as a fuel reforming reaction, the activity of the catalyst is enhanced. In addition, the support can be easily formed as desired due to its high mechanical strength.

The present invention will be described in further detail with reference to the following examples. These examples are for illustrative purposes only and are not intended to limit the scope of the present invention.

Example 1

7.41 g of aluminum powder (AL006035 Aluminum produced from Goodfellow Inc.) was placed in a vessel and the vessel was sealed using a binding device. 180 ml of water and the sealed vessel were added together to an autoclave and the autoclave was sealed. Then, a hydrothermal treatment process was performed at 150° C. for 5 hours. Then, the resulting bulk AlOOH structure was removed from the vessel and dried at 120° C. for 4 hours. The dried result was placed in a heating furnace and calcined therein at 520° C. for 4 hours. The prepared support was analyzed and measured. The results are shown in Table 1.

Example 2

A support was prepared in the same manner as in Example 1, except that the hydrothermal treatment was performed at 200° C. The prepared support was analyzed. The results are shown in Table 1.

Example 3

A support was prepared in the same manner as in Example 1, except that the hydrothermal treatment was performed at 250° C. The prepared support was analyzed. The results are shown in Table 1.

TABLE 1

|  | Hydrothermal Treatment Temperature (° C.) | Al conversion (%) | Micropore volume (ml/g) | Macropore volume (ml/g) | $Al_2O_3$ thickness (%) |
| --- | --- | --- | --- | --- | --- |
| Example 1 | 150 | 39.4 | 0.08 | 0.51 | 27 |
| Example 2 | 200 | 58.3 | 0.1 | 0.44 | 42 |
| Example 3 | 250 | 75.5 | 0.13 | 0.41 | 64 |

Figure 3A:
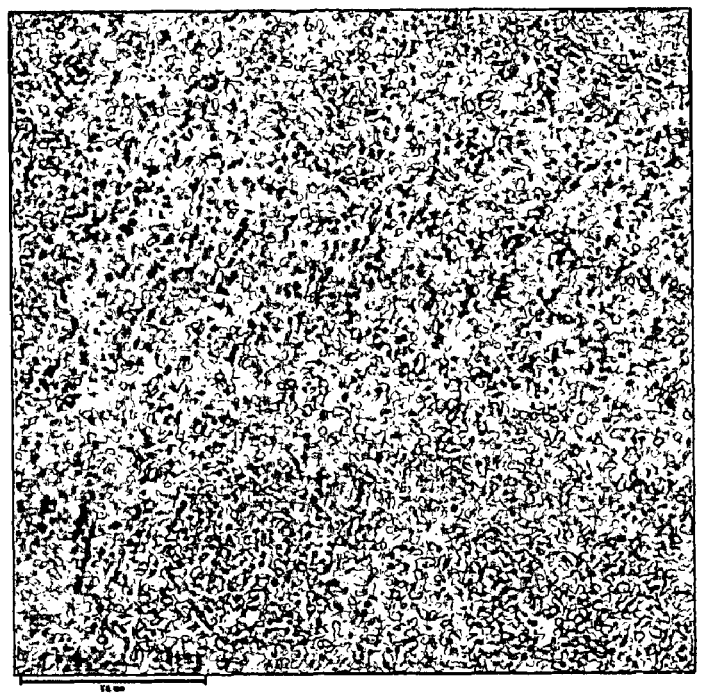
FIGS. 3A, 3B, and 3C are transmission electron microscopy (TEM) images of supports according to Examples 1, 2, and 3, respectively.
Figure 3B:
Figure 3C:
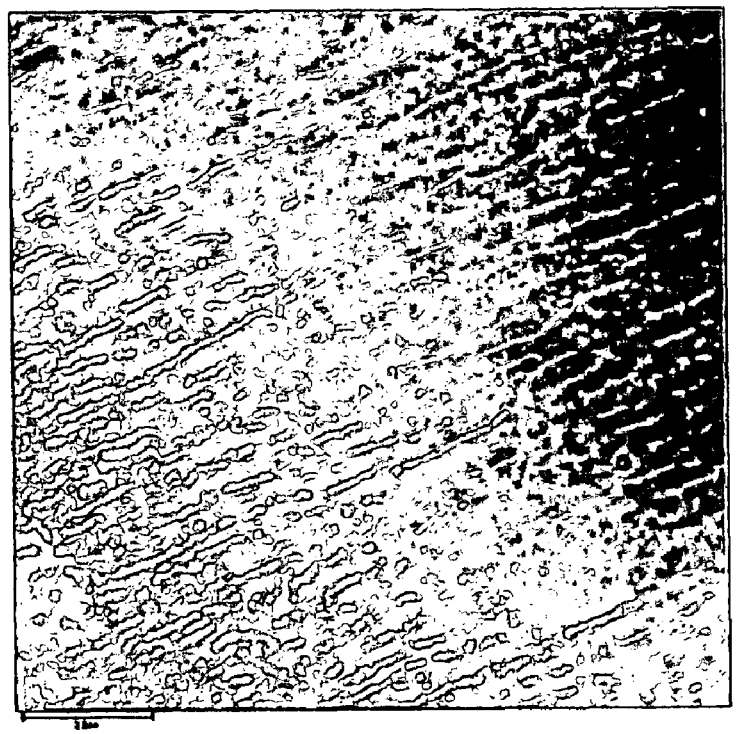

TEM images of the supports according to Examples 1 through 3 are shown in FIGS. 3A through 3C, respectively. Referring to FIGS. 3A through 3C, platelets are regularly arranged along the (110) direction in a lower structure and pores are formed between the aligned platelets.

Figure 4A:
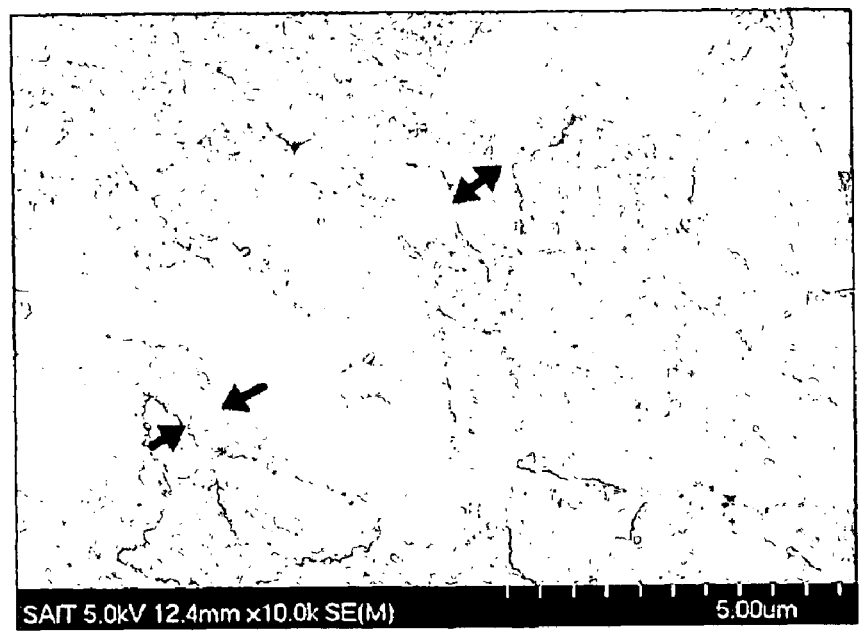
FIGS. 4A, 4B, and 4C are SEM images of the supports according to Examples 1, 2, and 3, respectively.
Figure 4B:
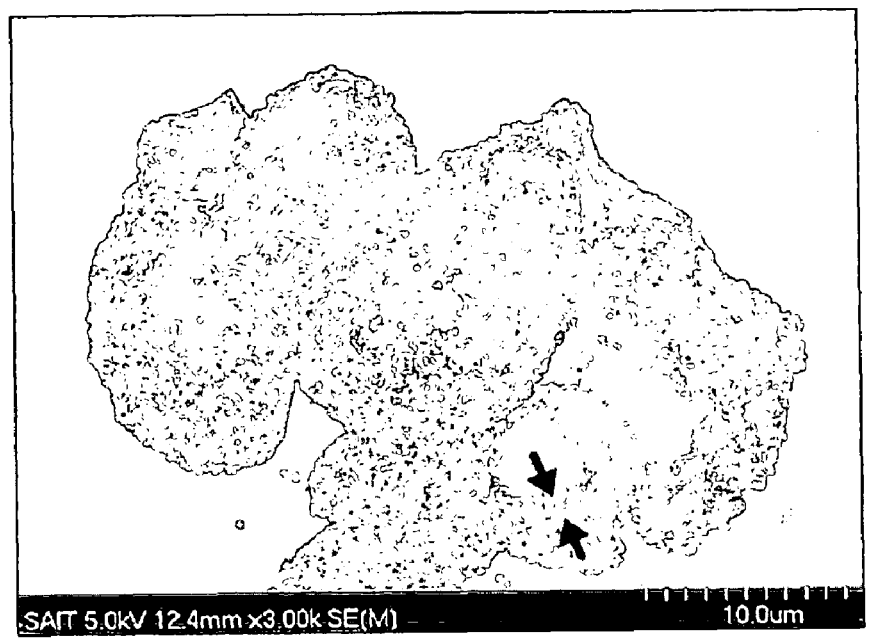
Figure 4C:
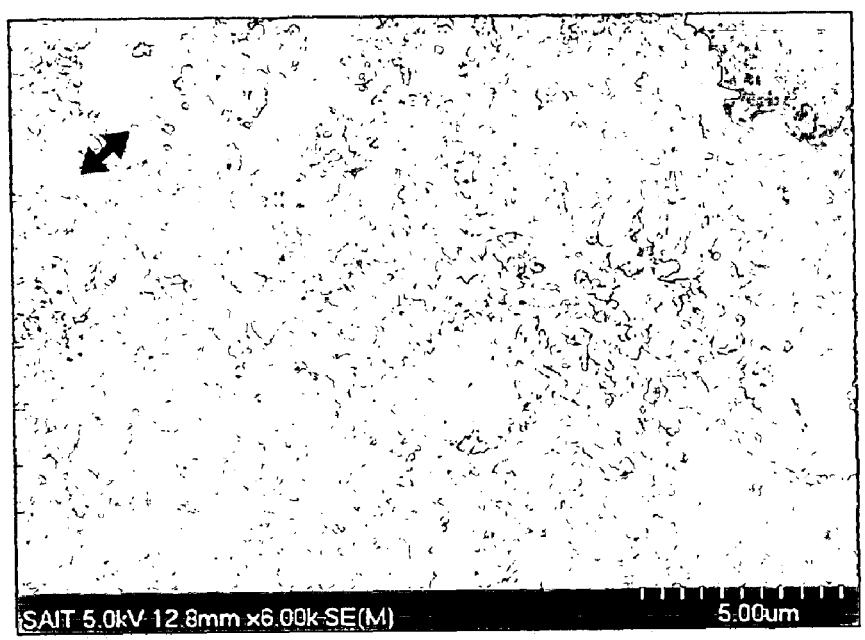

SEM images of the supports according to Examples 1 through 3 are shown in FIGS. 4A through 4C, respectively. Referring to FIGS. 4A through 4C, the supports according to Example 1 through 3 have core-shell shapes, which can be visually identified. The arrows in FIGS. 4A through 4C indicate sectional surfaces of the aluminum oxide shell encapsulating the aluminum core, and the rough-looking surface is the surface of the aluminum oxide shell.

Example 4

A supported catalyst was prepared by the incipient wetness method of impregnating the support of Example 2 with Ru. In the supported catalyst, the amount of Ru was 2% by weight.

Methane conversion using the supported catalyst was measured at 600° C. and 700° C. while the supply flow rate of the reactant was varied.

In addition, in order to measure the long-term performance of the supported catalyst, a unit cycle of a 5-hour operating and shut-down process was repeated about 20 times at 600° C. The same long-term performance test was performed when the temperature was 700° C.

Comparative Example 1

A supported catalyst in which an alumina support was impregnated with Ru was prepared by an incipient wetness method, and the methane conversion rate with respect to the change of the reactant flow rate was measured using the Ru-supported catalyst in the same manner as in Example 4.

Figure 5A:
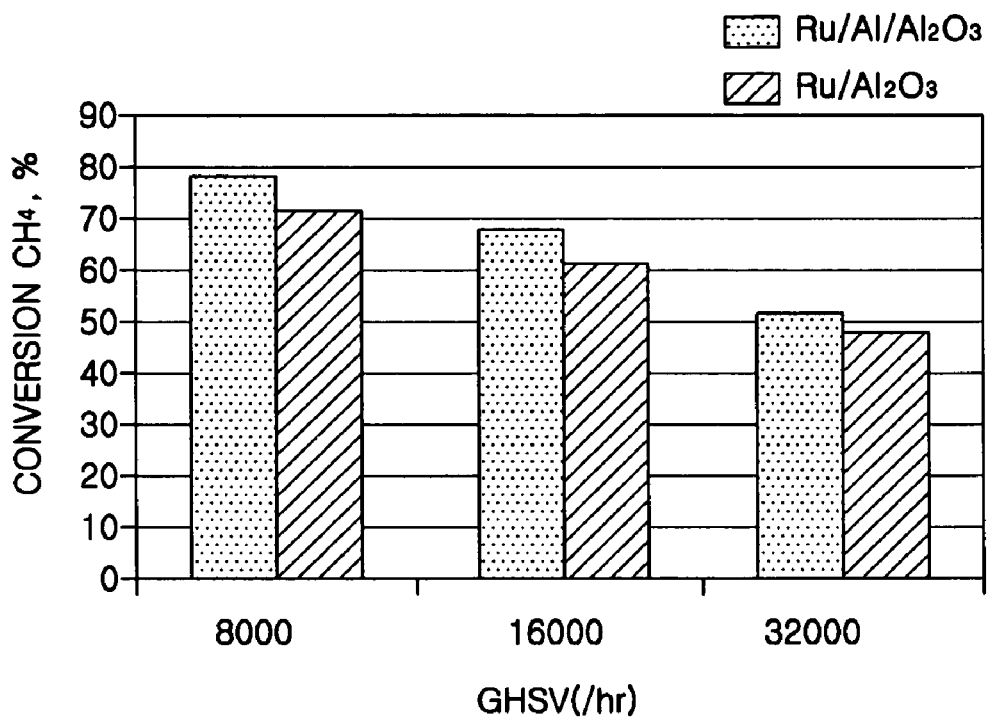
FIGS. 5A and 5B are bar charts showing the results of a performance test on supported catalysts of an Example 4 and a Comparative Example 1.
Figure 5B:
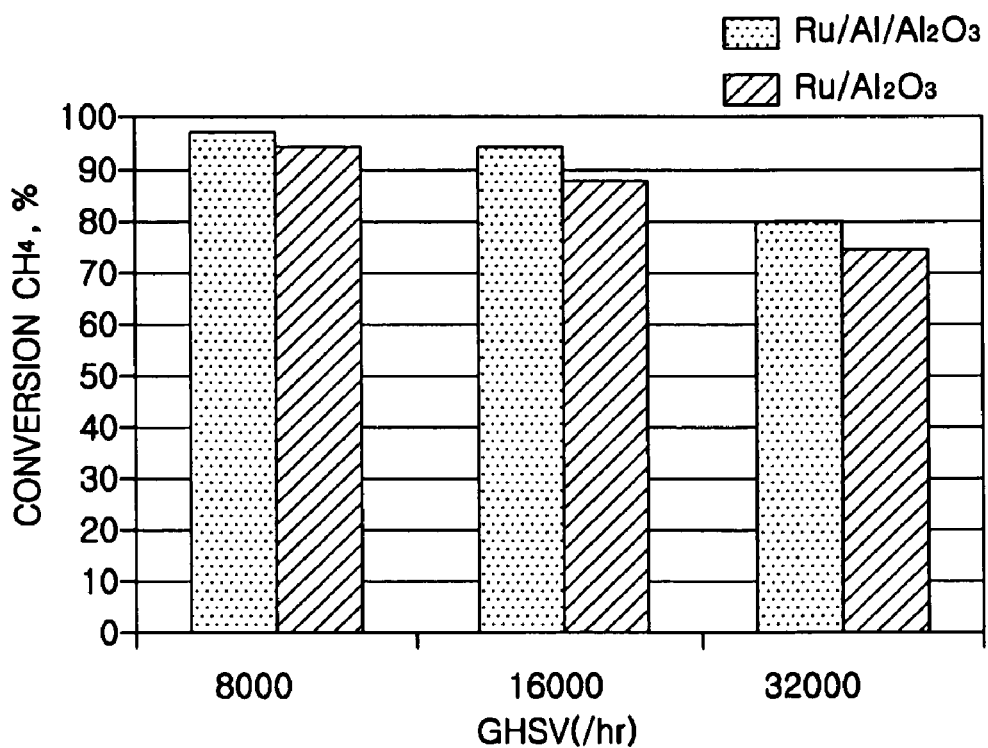

FIGS. 5A and 5B are bar charts showing the results of the performance test on the supported catalysts of Example 4 and Comparative Example 1. Referring to FIGS. 5A and 5B, the supported catalyst of Example 4 exhibited better activity than the supported catalyst of Comparative Example 1.

Comparative Example 2

A long-term performance test was performed using a commercially available catalyst (RUA, produced from Sud Chemie Inc.) in which similar amount of Ru is impregnated on alumina as in Example 4.

Figure 6A:
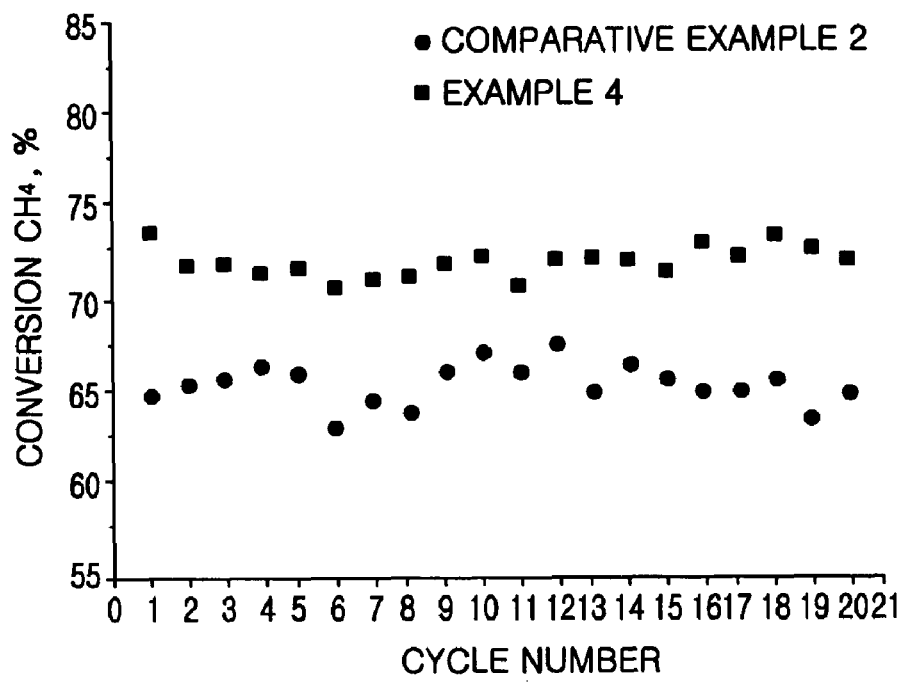
FIGS. 6A and 6B are bar charts showing the results of a long-term performance test on supported catalysts of Example 4 and a Comparative Example 2.
Figure 6B:
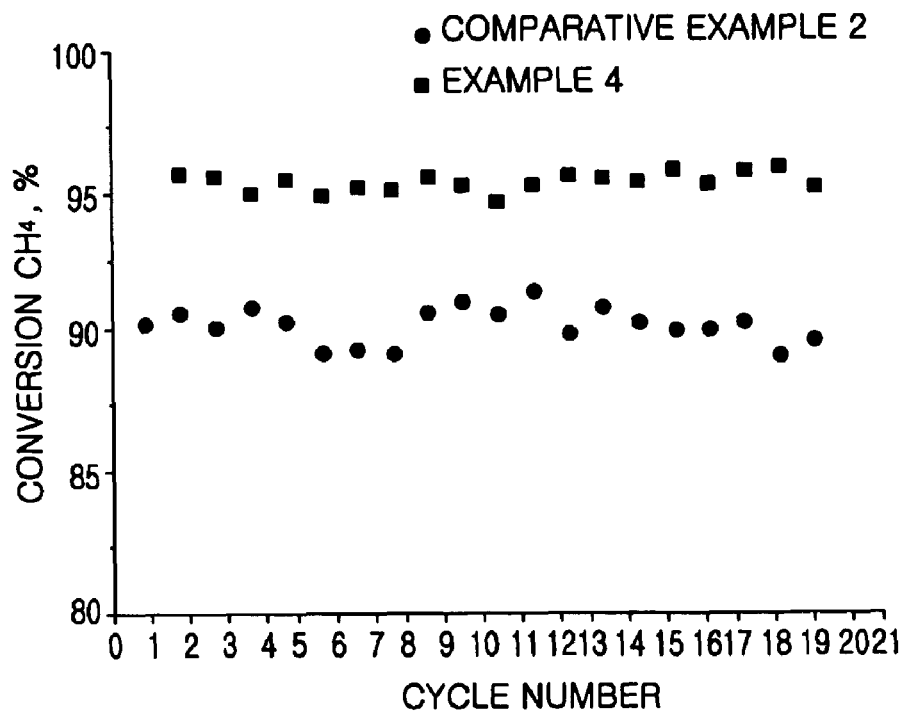

FIGS. 6A and 6B are bar charts showing the results of the long-term performance test on the supported catalysts of Example 4 and Comparative Example 2. Referring to FIGS. 6A and 6B, the supported catalyst according to Example 4 exhibited a constant long-term performance and better activity than the commercially available catalyst.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A support for a fuel reforming catalyst, the support comprising:
   a core of aluminum (Al); and
   an oxide of the core of aluminum ($Al_2O_3$) generated at a surface of and encapsulating the core of aluminum, wherein a total volume of micropores and mesopores in the support is in a range of 0.1 to 1.0 ml/g per unit mass, and a volume of macropores in the support is in a range of 0.4 to 1.2 ml/g per unit mass, wherein the support is in the form of particles, wherein the aluminum oxide encapsulating the aluminum of a particle of the support has a thickness of 10-65% of a radius of the particle, wherein the micropores and mesopores are homogeneously distributed in the aluminum oxide, and wherein the support for the fuel reforming catalyst has a mechanical strength in the range of 70-250 $kg/cm^2$.

2. The support of claim 1, wherein a weight ratio of the aluminum to the aluminum oxide is in a range of 1:9 to 8:2.

3. The support of claim 1, wherein a weight ratio of the aluminum to the aluminum oxide is in a range of 2:8 to 6:4.

4. The support of claim 1, wherein a porosity of the support is in a range of 0.1 to 0.9.

5. The support of claim 1, wherein a porosity of the support is in a range of 0.25 to 0.75.

6. The support of claim 1, wherein a volume of the micropores is in a range of 5-20%, a volume of the mesopores is in a range of 30-50%, and a volume of the macropores is in a range of 40-65%, with respect to a combined entire volume of the micropores, the mesopores and the macropores.

7. A method of preparing a support for a fuel reforming catalyst according to claim 1, the method comprising:

performing a hydrothermal treatment process by heating aluminum in water;

drying the hydrothermally treated result; and calcining the dried result.

8. The method of claim 7, wherein the hydrothermal treatment is performed by further including a salt of a metal that is active with respect to fuel reforming.

9. The method of claim 8, wherein the metal is a transition metal.

10. The method of claim 8, wherein the metal is selected from the group of metals consisting of Pt, Ni, Mo, Co, Pd, Ru, Rh, La, Ca, Mg, Ti, and alloys thereof.

11. The method of claim 7, wherein the hydrothermal treatment is performed by further including a surfactant.

12. The method of claim 7, wherein the hydrothermal treatment is performed at 120-280° C. for 1-24 hours.

13. The method of claim 7, wherein the hydrothermally-treated result is dried at 100-200° C. for 2-12 hours.

14. The method of claim 7, wherein the dried result is calcined at 500-850° C. for 2-12 hours.

15. The method of claim 7, wherein the hydrothermal treatment is performed by further including CaO, $Ca(NO_3)_2$, MgO, $TiO_2$, $La_2O_3$, $Mg(NO_3)_2$, $Ti(NO_3)_4$, $La(NO_3)_3$, a combination of Ta and Ni, or combinations thereof.

16. The method of claim 7, wherein the hydrothermal treatment is carried out on an aluminum powder to which a nitrate salt solution of Ca or Mg has been added.

17. A supported catalyst for fuel reforming comprising:

the support for the fuel reforming catalyst of claim 1; and an active component.

18. The supported catalyst of claim 17, wherein an amount of the active component is in a range of 0.1-40 parts by weight based on 100 parts by weight of the supported catalyst.

19. The supported catalyst of claim 17, wherein an amount of the active component is in a range of 1-25 parts by weight based on 100 parts by weight of the supported catalyst.

20. The supported catalyst of claim 17, wherein the active component is a transition metal.

21. The supported catalyst of claim 17, wherein the active component is selected from the group of metals consisting of Pt, Ni, Mo, Co, Pd, Ru, Rh, W, La, Ca, Mg, Ti, and alloys thereof.

22. A fuel processor comprising a fuel reformer comprising the supported catalyst for fuel reforming of claim 17.

23. A fuel cell system comprising a fuel processor including a reformer and at least one fuel cell, wherein the reformer comprises the supported catalyst of claim 17.

* * * * *